C. W. BAKER.
MEASURING IMPLEMENT.
APPLICATION FILED FEB. 7, 1919.
1,322,395.
Patented Nov. 18, 1919.
2 SHEETS—SHEET 1.
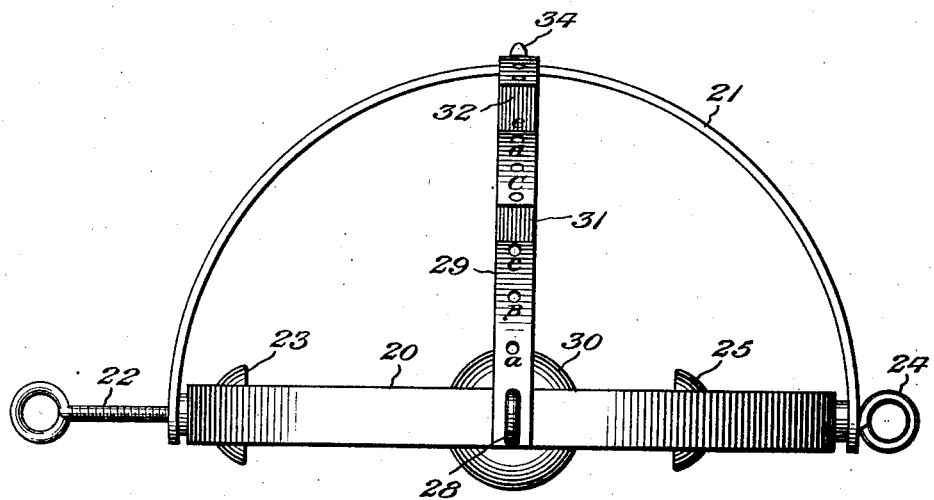
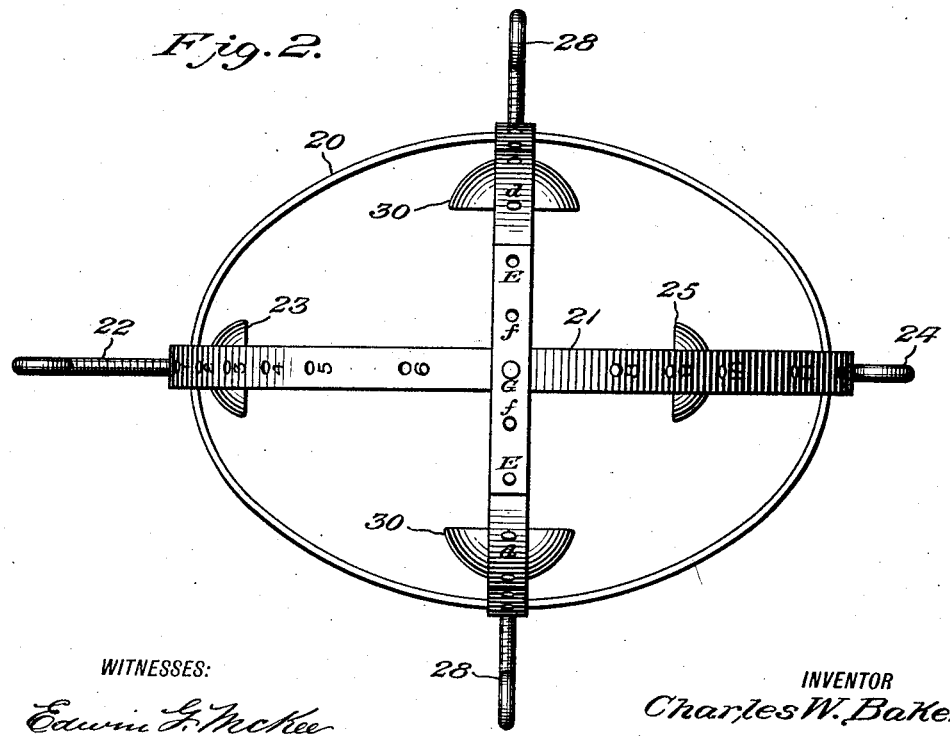
WITNESSES:
Edwin F. McKee
INVENTOR
Charles W. Baker
BY
Victor J. Evans
ATTORNEY

C. W. BAKER.
MEASURING IMPLEMENT.
APPLICATION FILED FEB. 7, 1919.

1,322,395.

Patented Nov. 18, 1919.
2 SHEETS—SHEET 2.

WITNESSES:
Edwin F. McKee

INVENTOR
Charles W. Baker
BY
Victor J. Evans
ATTORNEY

UNITED STATES PATENT OFFICE.

CHARLES W. BAKER, OF OMAHA, NEBRASKA.

MEASURING IMPLEMENT.

1,322,395.  Specification of Letters Patent. Patented Nov. 18, 1919.

Application filed February 7, 1919. Serial No. 275,620.

*To all whom it may concern:*

Be it known that I, CHARLES W. BAKER, a citizen of the United States, residing at Omaha, in the county of Douglas and State of Nebraska, have invented new and useful Improvements in Measuring Implements, of which the following is a specification.

This invention has reference to phrenological instruments or toys.

The object of the invention is to produce a device designed to be arranged upon a person's head, having associated therewith a swinging member in the nature of a gage which is adapted to be swung to different positions over the head of the person on which the device is arranged, and when retained at desired positions to indicate phrenological developments and with the aid of a book or chart the user of the device may analyze the component faculties of the mind of the person upon which the device is arranged.

The improvement is designed to create a certain amount of amusement, but at the same time is devised for instruction in the science of phrenology.

The improvement further consists in the construction, combination and operative arrangement of parts set forth in the following description and falling within the scope of what is claimed.

In the drawings:

Figure 1 is a side elevation illustrating the application of the device.

Fig. 2 is a top plan view of the improvement.

Figure 3:
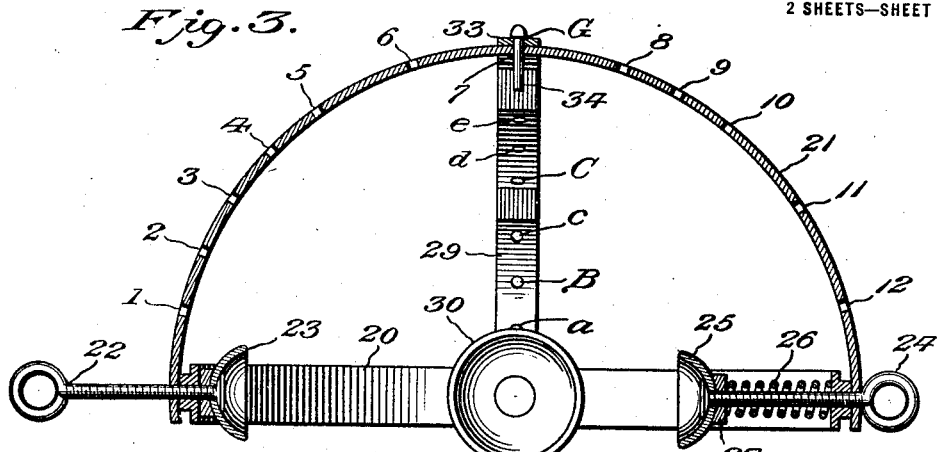
Fig. 3 is an approximately central vertical longitudinal sectional view through the device as illustrated in Figs. 1 and 2.
Figure 4:
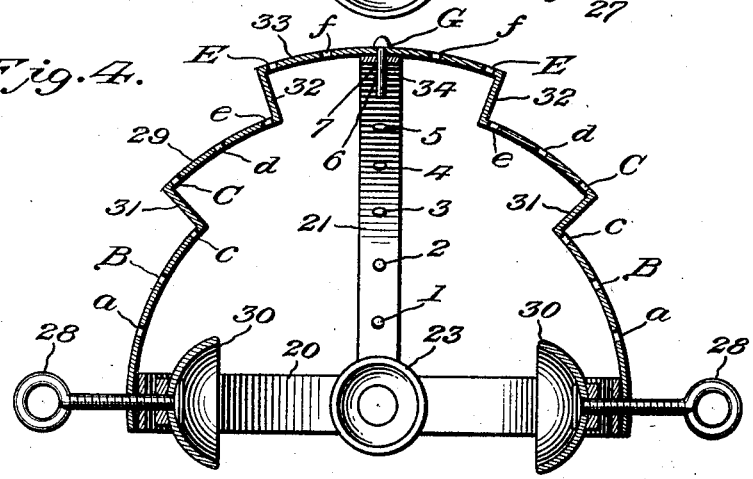
Fig. 4 is an approximately central transverse sectional view through the device as illustrated in Figs. 1 and 2.
Figure 5:
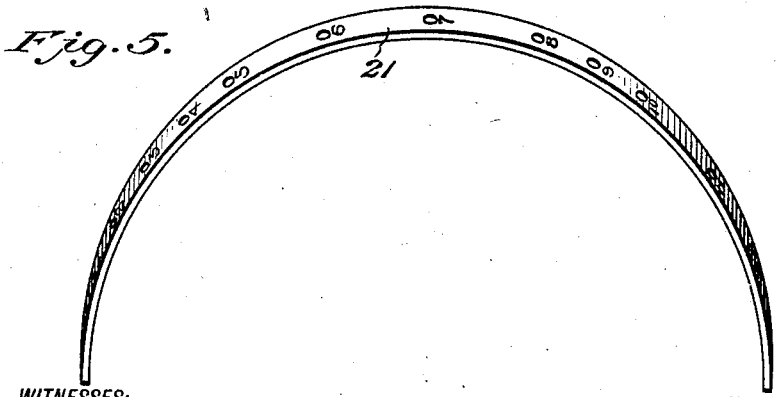

Before proceeding with the description of the improvement, it is here to be stated that the same is to be employed in connection with a guide or chart having printed therein the component faculties of the human mind separated into groups and sub-divisions thereof, each group and sub-division being properly indicated in the chart, the latter being in the nature of a booklet, and such additional reference thereto will be hereinafter made as will be necessitated for the full description and operation of the improvement.

The improvement contemplates the employment of a substantially oval-shaped band 20, the same being preferably constructed of metal and being shaped so as to be freely received around the head of the person upon which the device is to be applied. The band, at the narrow ends thereof or at the ends of the major axis contacted by the lower ends of an arch 21, has the securing means for one of the ends of the said arch in the nature of a headed bolt 22 threaded through openings in the arch and band. On the inner end of the bolt 22 is a flexible suction or vacuum cup 23. The other end of the arch may be connected to the band in any desired or preferred manner, and passing through suitable openings in the said end of the arch and the band is the shank of a headed member 24. This member has on its inner end a flexible suction cup 25, and the said member is surrounded by a spring 26 that exerts a tension between the inner edge of the band 20 and a metallic plate or washer 27 on the inner and flat face of the cup 25. If desired, means may be employed for tensioning the spring 26.

The arched plate 21, at desired spaced intervals has transverse openings therethrough, which, in the showing of the drawing are numbered from 1 to 12 respectively, and the purpose for these openings will presently be understood.

Pivotally secured through the medium of headed bolt members 28 centrally of the sides of the band 20 is an arched indicator 29. The bolts 28 pass through non-threaded openings in the ends of the arched indicator 29, and through threaded openings in the sides of the bands 20, and upon the inner ends of the said members 28 are suction cups 30.

As phrenological charts have their divisions and sub-divisions struck from lines at a curvature from the center of the cranium, as well as transverse lines connecting said arched or curved lines, and in order that the swinging indicator 29 may be brought centrally in a line with the longitudinal lines of division and sub-division on such charts, the arched indicator 29 is stepped as at 31 and 32 respectively. The indicator 29, between the steps 31 and 32 is provided with a plurality of openings, the openings on each of the sides nearest the band 20 being indicated by the character *a*, the next openings being indicated by the character B, and the next openings by the character c. These openings c, it will be noted, are arranged in a line with the outer faces of the steps 31 with the sides proper of the indicator. The next openings, between the steps 31 and 32 of the indicator, are indicated by the characters C, and the remaining pair of openings are indicated by the characters d and e respectively. The central portion of the indicator 29 is indicated, for distinction, by the numeral 33, the same, of course, being arranged between the oppositely disposed steps 32—32. This portion 33 has a central opening G, end openings E and openings f between the openings G and E.

The adjustment of the headed members permits of the suction cups engaging with the head of the person upon which the device is applied with sufficient rigidity to assure the proper arrangement of the said device thereon without inflicting injury to the head of the subject. The device when in position has the front suction cup arranged over the center of the forehead or against the nose at its juncture with the forehead, the rear suction cup being arranged at the base of the head and the side suction cups over the sides of the head. The rear suction cup is self-adjusting. Now the toy is operated as follows: The swinging indicator is brought over the arch until say the opening G is over some desired opening in the arch, say the opening G is over the opening 7. A pointer, indicated by the numeral 34 is passed through the registering openings G and 7, the same touching the head of the subject. As previously stated, a book of instructions and a phrenological chart are employed. The pointer, when passed through the registering openings in the arched plate 21 and in the pivoted indicator 29 is supposed to register the depth or size of the brain at the various divisions as indicated by the chart. The book of instructions fully sets forth propensities, sentiments, perceptive faculties and reflective faculties of the various divisions of the chart, so that the device will thus afford both amusement and instruction for the operator and for the person to which the device is applied.

Having thus described the invention, what is claimed as new is:—

In a device of the class described, an elliptical band, compression cups arranged in pairs at right angles with respect to each other upon the inner face of the band, adjusting means for bringing said cups toward or away from the band, spring expanding means between the band and one of said cups, right angularly disposed arch-shaped members having their ends pivotally secured to the band, said members having openings designed to register and to receive a pointer therethrough, and one of said arch-shaped members having spaced steps, all as and for the purpose set forth.

In testimony whereof I affix my signature.

CHARLES W. BAKER.